United States Patent
Wang

(10) Patent No.: US 10,103,563 B2
(45) Date of Patent: Oct. 16, 2018

(54) POWER SUPPLY SYSTEM HAVING WIRELESS SECURITY MODULE FOR VEHICLES

(71) Applicant: Chun-Hao Wang, Keelung (TW)

(72) Inventor: Chun-Hao Wang, Keelung (TW)

(*) Notice: Subject to any disclaimer, the term of this patent is extended or adjusted under 35 U.S.C. 154(b) by 114 days.

(21) Appl. No.: 15/414,642

(22) Filed: Jan. 25, 2017

(65) Prior Publication Data
US 2017/0217405 A1    Aug. 3, 2017

(30) Foreign Application Priority Data
Jan. 28, 2016 (TW) .............................. 105201283 U

(51) Int. Cl.
| | |
|---|---|
| *B60R 25/045* | (2013.01) |
| *H02J 7/00* | (2006.01) |
| *B60R 25/40* | (2013.01) |
| *H01M 2/34* | (2006.01) |
| *H01M 10/48* | (2006.01) |
| *H02P 1/02* | (2006.01) |
| *H02J 7/14* | (2006.01) |
| *H04W 4/80* | (2018.01) |

(52) U.S. Cl.
CPC .......... *H02J 7/0063* (2013.01); *B60R 25/045* (2013.01); *B60R 25/403* (2013.01); *H01M 2/341* (2013.01); *H01M 2/348* (2013.01); *H01M 10/486* (2013.01); *H02J 7/0029* (2013.01); *H02J 7/0031* (2013.01); *H02J 7/1461* (2013.01); *H02P 1/022* (2013.01); *H04W 4/80* (2018.02); *B60R 2325/101* (2013.01); *H01M 2200/10* (2013.01); *H01M 2220/20* (2013.01); *H02J 2007/0067* (2013.01); *Y02T 10/7005* (2013.01)

(58) Field of Classification Search
CPC ...... B60R 25/403; H02J 7/0029; H02J 7/0031
See application file for complete search history.

(56) References Cited

U.S. PATENT DOCUMENTS

2011/0074561 A1* 3/2011 Mackjust ................ B60R 25/10
340/426.13

* cited by examiner

*Primary Examiner* — Daniel Cavallari

(57) ABSTRACT

A power supply system having a wireless security module for vehicles is provided. The power supply system comprises a battery module, a power management module, an energy management module and the wireless security module. The battery module powers a starting motor of a vehicle. The power management module is used to receive a power from a power generating device. The power management module transmits the power of the power generating device into the battery module. The power management module comprises a monitoring unit and a controlling unit. The monitoring unit is used to monitor a voltage value of the battery module. When the voltage value monitored is equal to a minimum setting, the power management module is used to prevent the battery module from powering the starting motor. When the voltage value monitored is equal to a maximum setting, the power management module stops powering the battery module. The controlling unit is used to control a current value outputted from the battery module. Furthermore, when the voltage value of the battery module is equal to the maximum setting, the energy management module is used to receive a power from the power generating device. The power is transmitted into the vehicle by the energy management module.

14 Claims, 7 Drawing Sheets

_US 10,103,563 B2_

POWER SUPPLY SYSTEM HAVING WIRELESS SECURITY MODULE FOR VEHICLES

BACKGROUND OF THE INVENTION

Field of the Invention

The present invention relates to a power supply system for vehicles, more particularly to power supply system having a wireless security module for vehicles.

Description of Related Art

In people's lives, Car or Motorcycle has been an indispensable means of transport, and each vehicle includes an automobile battery. The automobile battery is used to start the vehicles engine, store power and provide power. Furthermore, most of the automotive batteries are lead-acid batteries. Lead-acid battery is a very early battery system, which includes a simple structure, a mature technology and low prices. Therefore, Lead-acid battery has been standard equipment for the vehicles.

However, Lead-acid batteries include some drawbacks. For example, heavy metals and waste liquid generated by Lead-acid battery harm the ecological balance and the human health. Moreover, Lead-acid batteries typically take a long time of charging and the weight of lead-acid battery is also high. When the capacity of Lead-acid batteries is less than a half of the fully charged capacity and not to charge, Lead-acid batteries will reduce its life performance. Therefore, it will cause the automotive battery cannot start the engine of the vehicles.

Furthermore, if owner leaves his vehicle and the vehicle has been targeted by some bad guys, the vehicles would probably be stolen in a short time.

Therefore, how to improve the problems of Lead-acid batteries and prevent the vehicles from being stolen is worth considering to a person having ordinary skills in the art.

SUMMARY OF THE INVENTION

A power supply system having a wireless security module for vehicles is provided. The power supply system is configured to power into the vehicles stably, increase service life of the automobile battery and prevent the vehicles from being stolen.

A power supply system having a wireless security module for vehicles is provided. The power supply system having a wireless security module for vehicles comprises a battery module, a power management module, an energy management module and the wireless security module. The battery module powers a starting motor of a vehicle. The power management module is used to receive a power from a power generating device. The power management module transmits the power of the power generating device into the battery module. The power management module comprises a monitoring unit and a controlling unit. The monitoring unit is used to monitor a voltage value of the battery module. When the voltage value monitored is equal to a minimum setting, the power management module is used to prevent the battery module from powering the starting motor. When the voltage value monitored is equal to a maximum setting, the power management module stops powering the battery module. The controlling unit is used to control a current value outputted from the battery module. When the voltage value of the battery module is equal to the maximum setting, the energy management module is used to receive a power from the power generating device. The power is transmitted into the vehicle by the energy management module. The wireless security module is connected to the power management module. The wireless security module includes a Bluetooth transmitter. The wireless security module is connected to a portable electronic device via the Bluetooth transmitter. When the wireless security module is not connected to a portable electronic device, the controlling unit is used to lower the current value outputted from the battery module.

In the power supply system, the energy management module is configured to regulate the power of the power generating device into a stable power.

In the power supply system, the minimum setting is 10.4V and the maximum setting is 12.6V.

In the power supply system, the battery module is a lithium battery, a nickel-cadmium battery or a nickel-metal hydride battery.

In the power supply system, the portable electronic device is a Bluetooth keychain, a smart phone, a tablet or a laptop.

In the power supply system, the wireless security module further includes a NFC sensor. Before the wireless security module is connected to a portable electronic device, a pairing process of the wireless security module with the portable electronic device is simplified by the NFC sensor.

In the power supply system, the power management module further includes a temperature sensor. The battery module is measured by the temperature sensor in order to obtain a temperature value of the battery module.

In the power supply system, when an overvoltage condition is generated in the power generating device, the power management module stops powering the battery module.

In the power supply system, the wireless security module includes a GPS positioning tracker and a wireless transmission module. A current location of the power supply system is obtained by the GPS positioning tracker. The current location is transmitted into the portable electronic device via a way of a wireless transmission by the wireless transmission module.

In the power supply system, both the voltage value and the temperature value of the battery module are transmitted into the portable electronic device via the way of the wireless transmission by the wireless transmission module.

In the power supply system, the power management module is connected to a driving computer of the vehicle. The voltage value and the temperature value are transmitted into the driving computer by the power supply system.

In the power supply system, the way of the wireless transmission is Bluetooth Low Energy (BLE), Zigbee, GPRS, 3G, LTE technology or LoRa technology.

In the power supply system, the power supply system comprises a restart button. The restart button is connected to the power management module. When the voltage value of the battery module is less than 10.4V, the power management module is in a sleep state. Only press the restart button for 5 seconds, the power management module wakes up in the sleep state.

The foregoing, as well as additional objects, features and advantages of the invention will be more readily apparent from the following detailed description, which proceeds with reference to the accompanying drawings.

DETAILED DESCRIPTION OF THE INVENTION

Figure 1:
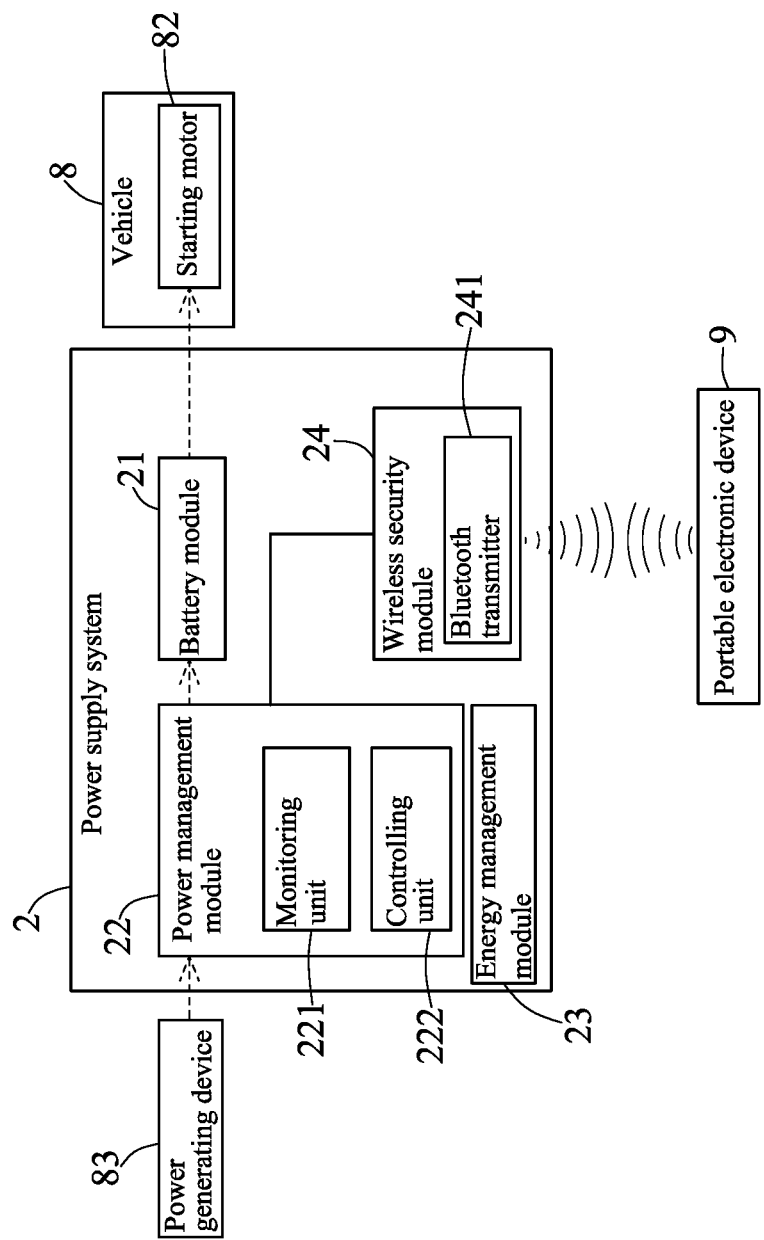
FIG. 1 illustrates a block diagram of a power supply system 2 for vehicles in accordance with an embodiment of the present invention.
Figure 2:
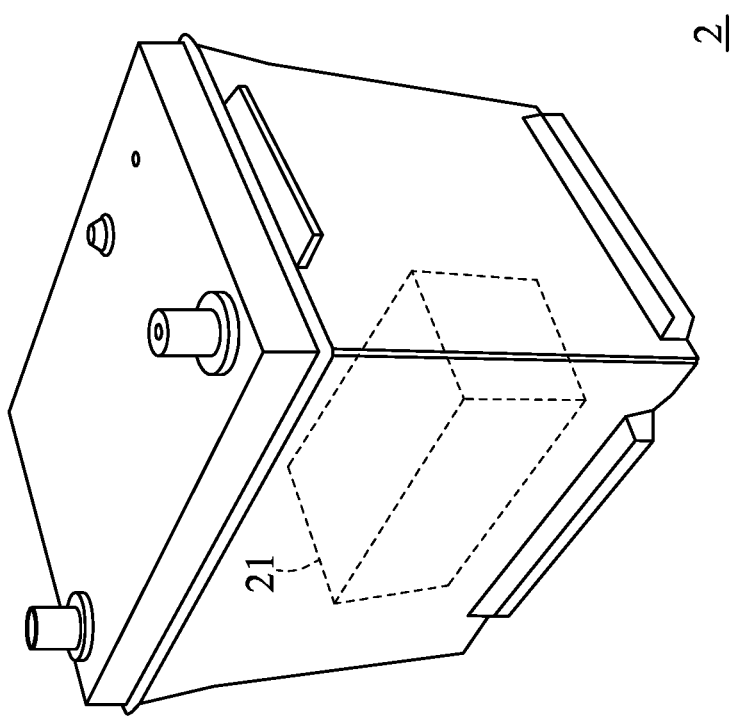
FIG. 2 illustrates a perspective view of the power supply system 2 in accordance with an embodiment of the present invention.
Figure 3:
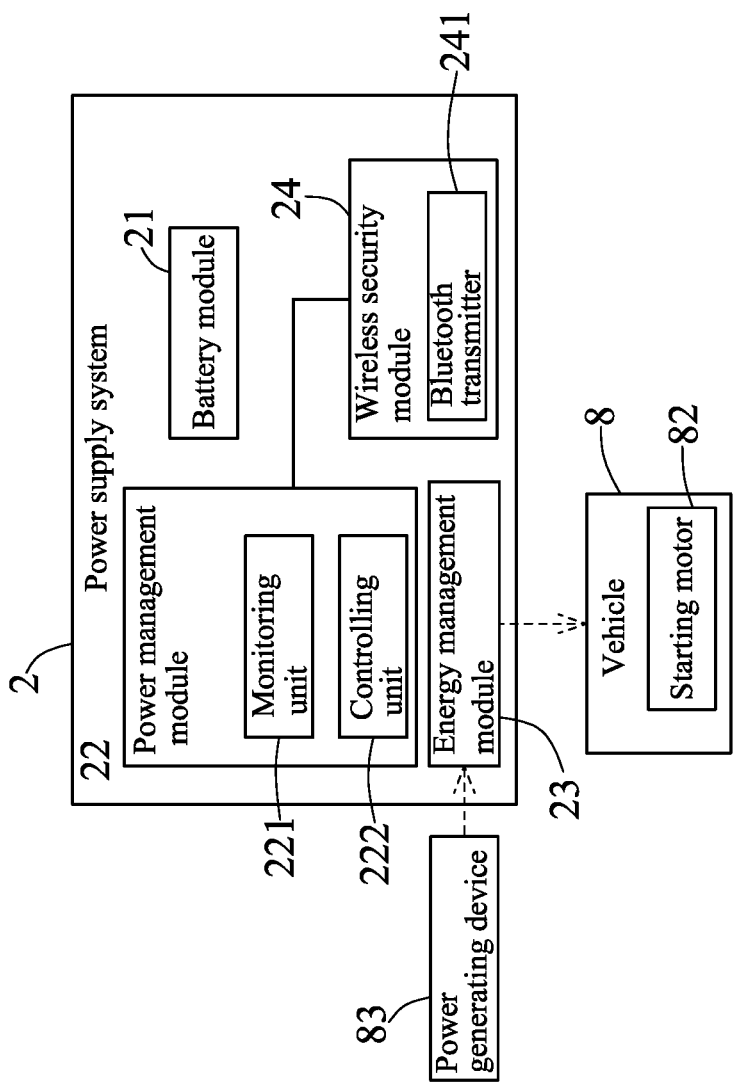
FIG. 3 illustrates a schematic diagram of an energy management module 23.

Please refer to FIG. 1 and FIG. 2. FIG. 1 illustrates a block diagram of a power supply system 2 for vehicles in accordance with an embodiment of the present invention. FIG. 2 illustrates a perspective view of the power supply system 2 in accordance with an embodiment of the present invention. The power supply system 2 for vehicles comprises a battery module 21, a power management module 22, an energy management module 23 and the wireless security module 24. The battery module 21 powers a starting motor 82 of a vehicle 8 in order that the starting motor 82 powers an engine of a vehicle 8. For example, the battery module 21 is a lithium battery, a nickel-cadmium battery or a nickel-metal hydride battery, and the vehicle 8 is a car or a motorcycle. The power management module 22 is used to receive a power from a power generating device 83 (The power generation device 83 is typically a generator of the vehicle 8, and when the vehicle 8 is in the running state, the generator would generate electricity.). The power management module 22 transmits the power of the power generating device 83 into the battery module 21. Therefore, the battery module 21 could store electricity. Moreover, the power management module 22 comprises a monitoring unit 221 and a controlling unit 222. The monitoring unit 221 is used to monitor a voltage value of the battery module. The controlling unit 222 is used to control a current value outputted from the battery module 21. When the voltage value of the battery module 21 monitored by the monitoring unit 221 is equal to a minimum setting, the power management module 22 is used to prevent the battery module 21 from powering the starting motor. For example, when the voltage value of the battery module 21 drops to 10.4 V, this means that the energy stored in the battery module 21 is not much left. Therefore, the power management module 22 is configured to prevent the battery from powering the vehicle 8 continuously in order to prevent the battery module 21 from being in an over-discharged condition. Furthermore, when the voltage value monitored by the monitoring unit 221 is equal to a maximum setting, the power management module 22 is used to prevent the power generating device 83 from powering the battery module 21. For example, when the voltage value of the battery module 21 rises to 12.6 V, this means that the energy stored in the battery module 21 is full. Therefore, the power management module 22 is configured to prevent the power generating device 83 from powering the battery module 21 in order to prevent the battery module 21 from being in an over-charged condition. In contrast to the traditional automobile battery, the power supply system 2 could prevent the battery module 21 from being in an over-discharged condition or an over-charged condition. Therefore, the power supply system 2 could increase service life of the battery module 21. Moreover, the battery module 21 is a lithium battery, so it would not be decomposed out of heavy metals or toxic waste to reduce harm to the ecology. In addition, the lithium battery is also lighter in weight. In the above, after the battery module 21 is fully charged, the battery module 21 stops receiving external power. At the same time, if the power provided by the power generating device 83 is transmitted into the energy management module 23 (Please refer to the FIG. 3. FIG. 3 illustrates a schematic diagram of an energy management module 23.), the energy management module 23 is configure to regulate the power of the power generating device 83 into a stable power (about 12V to 15.5V). Then, the stable power is transmitted into internal or external electrical appliance of vehicle 8. For example, the internal or external electrical appliance is driving computers, ignition systems, car audio, driving recorders, navigation devices and headlights. In the above, the energy management module 23 is composed of one MCU, a plurality of decentralized parts, a plurality of electrolytic capacitors in parallel and a plurality of the super capacitors in parallel. The power management module 22 stops powering the battery module 21 to prevent the battery module 21 from being burned because of the sudden increase in the voltage when an overvoltage condition is generated in the power generating device 83.

Place refer to FIG. 1 again. The wireless security module 24 is connected to the power management module 22. The wireless security module 24 includes a Bluetooth transmitter 241. The wireless security module 24 is connected to a portable electronic device 9 via the Bluetooth transmitter 241. For example, the portable electronic device 9 is a Bluetooth keychain, a smart phone, a tablet or a laptop. When the Bluetooth transmitter 241 is not connected to a portable electronic device 9, the controlling unit 222 is used to lower the current value outputted from the battery module 21. In detail, a transmission distance of the Bluetooth technology is about 10 meters. Therefore, if the distance between the portable electronic device 9 and the power supply system exceeds 10 meters (It means the owner of the portable electronic device 9 with his vehicle has a distance.), the connection of the Bluetooth transmitter 241 and the portable electronic device 9 is interrupted by the distance. Once the connection is interrupted, the current value outputted from the battery module would be lowered by the controlling unit. For example, the current value outputted from the battery module is lowered to 30 to 40 amperes. The current value of 30 to 40 amperes is unable starting the starting motor 82 of the vehicle 8 (Operation of the starter motor 82 requires the current value of 300 to 400 amperes.). As a result, the engine of the vehicle 8 could not be started by the starting motor 82. In detail, if the owner of the portable electronic device 9 with his vehicle has a distance and the owner left the car key in the vehicle 8, the bad guy wanting to steal the car could not start the engine of the vehicle 8. Therefore, the wireless security module 24 could reduce the probability of the vehicle 8 stolen.

Figure 4:
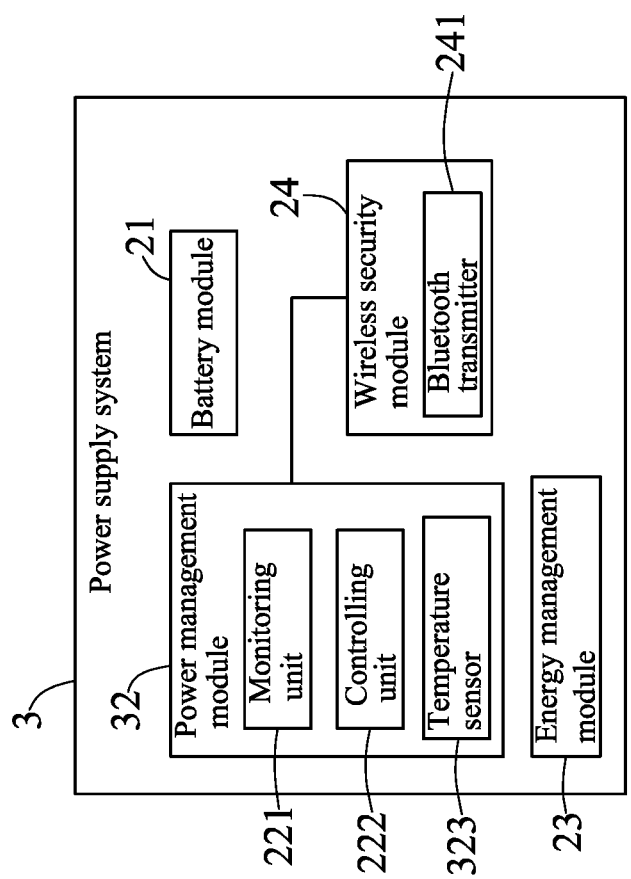
FIG. 4 illustrates a block diagram of a power supply system 3 for vehicles in accordance with another embodiment of the present invention.

Place refer to FIG. 4. FIG. 4 illustrates a block diagram of a power supply system 3 for vehicles in accordance with another embodiment of the present invention. The power supply system 3 is derived from the power supply system 2. The power management module 32 of the power supply system 3 includes a temperature sensor 323. The battery module 21 is measured by the temperature sensor 323 in order to obtain a temperature value of the battery module 21. Therefore, when the temperature value of the battery module 21 is too high, the power management module 32 would prevent the battery module 21 from outputting power or inputting power to prevent the dangerous situation of the battery explosion.

Figure 5:
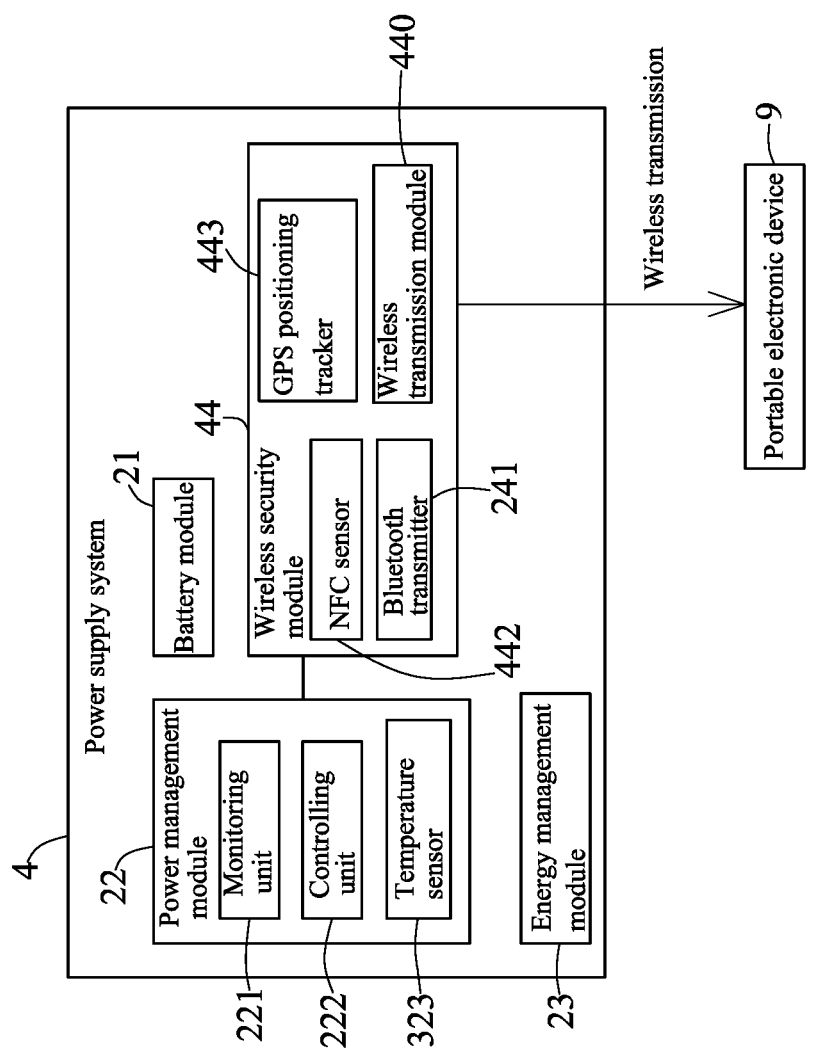
FIG. 5 illustrates a block diagram of a power supply system 4 for vehicles in accordance with another embodiment of the present invention.

Place refer to FIG. 5. FIG. 5 illustrates a block diagram of a power supply system 4 for vehicles in accordance with another embodiment of the present invention. The power supply system 4 includes all of the features of the power supply system 3. In addition, the power supply system 4 further includes a NFC sensor 442, a GPS positioning tracker 443 and a wireless transmission module 440. A pairing process of the wireless security module 44 with the portable electronic device 9 is simplified by the NFC sensor 442, before the wireless security module 44 is connected to the portable electronic device 9. The NFC sensor 442 is configured to speed up the Bluetooth connection between the Bluetooth transmitter 241 and the portable electronic device 9. Furthermore, a current location of the power supply system 4 is obtained by the GPS positioning tracker 443. The current location is transmitted into the portable electronic device 9 via a way of a wireless transmission by the wireless transmission module 440. The way of the wireless transmission is Bluetooth Low Energy (BLE), Zigbee, GPRS, 3G, LTE technology or LoRa technology that is able to transmit data over long distances. As a result, if owner cannot find his vehicle, the owner can know the position where the vehicle 8 is located via the current location transmitted into the portable electronic device 9. In addition, if the vehicle 8 is stolen by some bad guy, using the portable electronic device 9 receives the current location to find the vehicle 8. In the above, because the wireless security module 44 is connected to the power management module 22, the voltage value of the battery module 21 monitored by the monitoring unit 221 and the temperature value of the battery module 21 measured by the temperature sensor 323 could be transmitted into the portable electronic device 9 by the wireless transmission module 440. As a result, the owner could get the remaining power of the battery module 21 via the voltage value and know whether the battery module 21 is in an overheated state via the temperature value.

Figure 6:
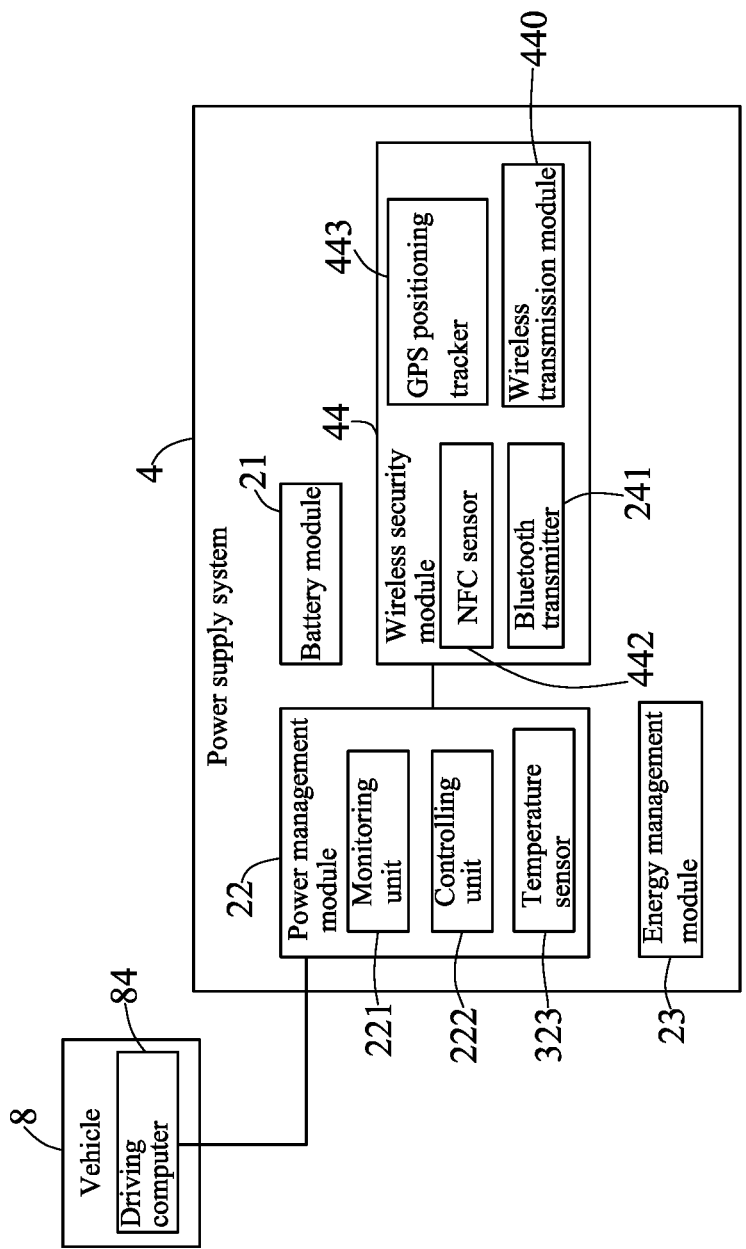
FIG. 6 illustrates a block diagram of the power supply system 4 connected to a driving computer 84.

Place refer to FIG. 6. FIG. 6 illustrates a block diagram of the power supply system 4 connected to a driving computer 84. The power management module 22 of the power supply system 4 is connected to a driving computer 84 of the vehicle 8. Therefore, the voltage value of the battery module 21 monitored by the monitoring unit 221 and the temperature value of the battery module 21 measured by the temperature sensor 323 are also transmitted into the driving computer 84 by the power supply system 4. Then, both the voltage value and the temperature transmitted into the driving computer 84 are displayed on the video screen of the vehicle 8, and the driving computer 84 can issue an alarm of an abnormal value. In the above, the power management module 22 is connected to the driving computer 84 via Controller Area Network (CAN bus) or other communication protocol.

Figure 7:
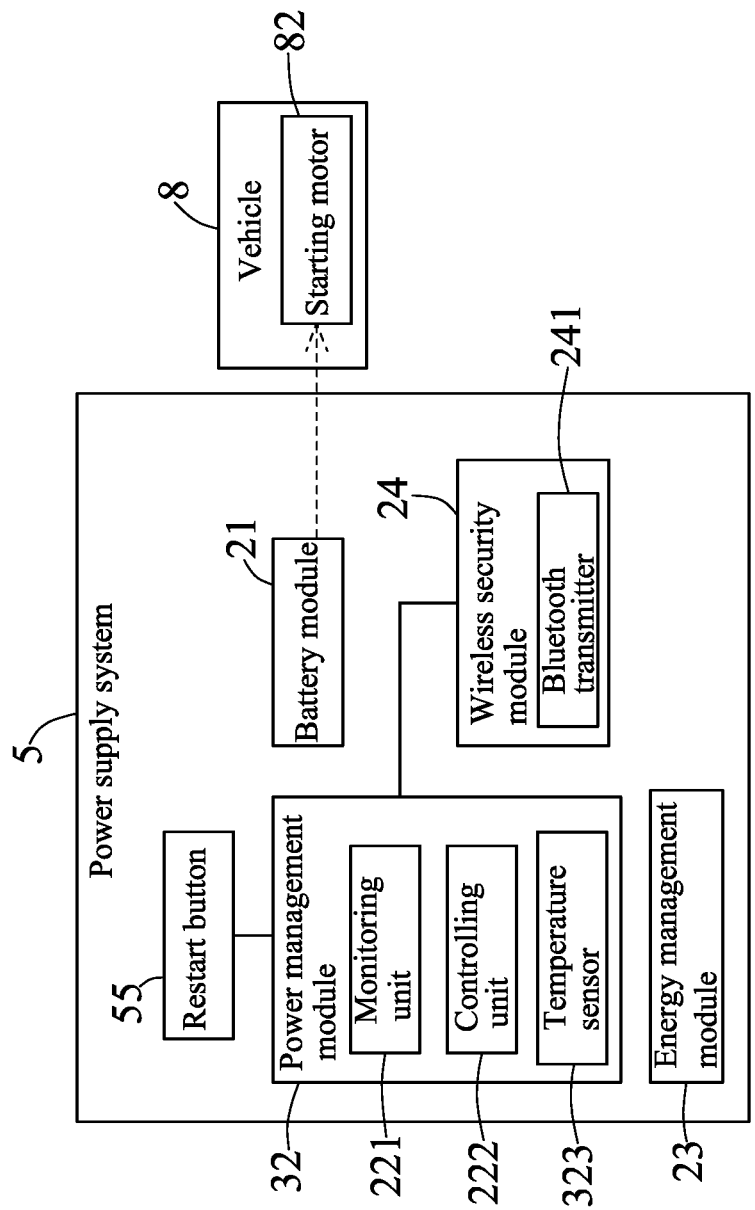
FIG. 7 illustrates a block diagram of a power supply system 5 for vehicles.

Place refer to FIG. 7. FIG. 7 illustrates a block diagram of a power supply system 5 for vehicles. The power supply system 5 is derived from the power supply system 3. The power supply system 5 further comprises a restart button 55. The restart button 55 is connected to the power management module 32. If the vehicle 8 is not in operation for a long time or its lights are not turned off, the voltage value of the battery module 21 would be less than 10.4V. When the voltage value of the battery module 21 is less than 10.4V, the power management module 32 is in a sleep state in order to prevent the battery module 21 from outputting power. In this state, only press the restart button for 5 seconds, the power management module would wake up in the sleep state. The owner could use the battery module 21 powering the starting motor 82 to start vehicles engine without using traditional generators or the traditional way of rescue. In the above, as long as the starting motor 82 receives the voltage value more than 9.5V, the starting motor 82 would be rebooted again. Therefore, the battery module 21 including 10.4 voltage values is enough to start the starting motor 82.

Although the description above contains many specifics, these are merely provided to illustrate the invention and should not be construed as limitations of the invention's scope. Thus it will be apparent to those skilled in the art that various modifications and variations can be made in the system and processes of the present invention without departing from the spirit or scope of the invention.

What is claimed is:

1. A power supply system having a wireless security module for vehicles comprising:
   a battery module powers a starting motor of a vehicle;
   a power management module is used to receive a power from a power generating device, and the power management module transmits the power of the power generating device into the battery module, the power management module comprising:
   a monitoring unit is used to monitor a voltage value of the battery module; when the voltage value monitored is equal to a minimum setting, the power management module is used to prevent the battery module from powering the starting motor; when the voltage value monitored is equal to a maximum setting, the power management module stops powering the battery module;
   a controlling unit is used to control a current value outputted from the battery module;
   an energy management module, when the voltage value of the battery module is equal to the maximum setting, the energy management module is used to receive a power from the power generating device, and the power is transmitted into the vehicle by the energy management module;
   the wireless security module is connected to the power management module, and the wireless security module includes a Bluetooth transmitter, and the wireless security module is connected to a portable electronic device via the Bluetooth transmitter;
   wherein when the Bluetooth transmitter e is not connected to a portable electronic device, the controlling unit is used to lower the current value outputted from the battery module.

2. The power supply system of claim 1, wherein the power of the power generating device is regulated by the energy management module into a stable power.

3. The power supply system of claim 1, wherein the minimum setting is 10.4V and the maximum setting is 12.6V.

4. The power supply system of claim 1, wherein the battery module is a lithium battery, a nickel-cadmium battery or a nickel-metal hydride battery.

5. The power supply system of claim 1, wherein the portable electronic device is a Bluetooth keychain, a smart phone, a tablet or a laptop.

6. The power supply system of claim 1, wherein the wireless security module further includes a NFC sensor, and before the wireless security module is connected to a portable electronic device, a pairing process of the wireless security module with the portable electronic device is simplified by the NFC sensor.

7. The power supply system of claim 1, wherein the power management module further includes a temperature sensor, and the battery module is measured by the temperature sensor in order to obtain a temperature value of the battery module.

8. The power supply system of claim 1, wherein when an overvoltage condition is generated in the power generating device, the power management module stops powering the battery module.

9. The power supply system of claim 7, wherein the wireless security module includes a GPS positioning tracker and a wireless transmission module, and a current location of the power supply system is obtained by the GPS positioning tracker, and the current location is transmitted into the portable electronic device via a way of a wireless transmission by the wireless transmission module.

10. The power supply system of claim 9, wherein both the voltage value and the temperature value of the battery module are transmitted into the portable electronic device via the way of the wireless transmission by the wireless transmission module.

11. The power supply system of claim 7, wherein the power management module is connected to a driving computer of the vehicle, and the voltage value and the temperature value are transmitted into the driving computer by the power supply system.

12. The power supply system of claim 9, wherein the way of the wireless transmission is Bluetooth Low Energy (BLE), Zigbee, GPRS, 3G, LTE technology or LoRa technology.

13. The power supply system of claim 10, wherein the way of the wireless transmission is Bluetooth Low Energy (BLE), Zigbee, GPRS, 3G, LTE technology or LoRa technology.

14. The power supply system of claim 7 further comprising:
    a restart button is connected to the power management module;
    wherein when the voltage value of the battery module is less than 10.4V, the power management module is in a sleep state; wherein only press the restart button for 5 seconds, the power management module wakes up in the sleep state.

* * * * *